US006075305A

United States Patent [19]

Daikoku et al.

[11] Patent Number: 6,075,305

[45] Date of Patent: Jun. 13, 2000

[54] DYNAMO-ELECTRIC MACHINE

[75] Inventors: Akihiro Daikoku; Toshinori Tanaka; Kiyohide Okamoto; Shuji Isono; Akihiko Imagi; Yoshio Yoshikuwa; Masafumi Okazaki; Kyouhei Yamamoto, all of Tokyo, Japan

[73] Assignee: Mitsubishi Denki Kabushiki Kaisha, Tokyo, Japan

[21] Appl. No.: 09/384,977

[22] Filed: Aug. 30, 1999

[30] Foreign Application Priority Data

Jan. 8, 1999 [JP] Japan .................................. 11-003068

[51] Int. Cl.[7] ...................................................... H02K 13/00

[52] U.S. Cl. .......................... 310/233; 310/231; 310/234; 310/204; 310/72; 310/180; 310/133; 310/128

[58] Field of Search ..................................... 310/233, 231, 310/234, 235, 204, 130, 140, 72, 180, 136, 131, 133, 128

[56] References Cited

U.S. PATENT DOCUMENTS

| | | | |
|---|---|---|---|
| 3,484,634 | 12/1969 | Ireland | 310/204 |
| 4,126,798 | 11/1978 | Carr, Jr. et al. | 310/204 |
| 5,789,842 | 8/1998 | Steinback et al. | 310/233 |

*Primary Examiner*—Elvin Enad
*Assistant Examiner*—Thanh Lam
*Attorney, Agent, or Firm*—Leydig, Voit & Mayer

[57] ABSTRACT

A dynamo-electric machine satisfies an expression $$R_{eq} \geqq (\rho_0 \cdot (r1 * \tau)/(S/3)) * (2.5)$$

where $\rho_0$ ($\Omega \cdot$m) is the resistivity of armature coil, S ($m^2$) is the cross-sectional area of the conductor portions thereof, r1 (m) is radius of rotation of the connecting portions between equalizers and armature circuits, namely the armature coil, risers, or commutator segments, $\tau$ (rad) is the pitch of pole pairs, and $R_{eq}$ ($\Omega$) is the resistance value of the equalizer.

8 Claims, 11 Drawing Sheets

11 1 2 4 5 9 10 8 3 7 6

1
2
3
4
5
6
7
8
9
10
11

110
107
110
107
103
i1
i2
i3
i4
110
107
110

DYNAMO-ELECTRIC MACHINE

BACKGROUND OF THE INVENTION

1. Field of the Invention

The present invention relates to a dynamo-electric machine in which current regulation is performed by placing brushes in contact with commutator segments.

2. Description of the Related Art

FIG. 12 is a partial cross-section of a multi-polar, lap-wound, directcurrent electric motor being a conventional dynamo-electric machine. In this electric motor, a commutator assembly 101 is disposed in the vicinity of an armature 100.

The armature 100 comprises: a core 102 having slots extending longitudinally; and an armature coil 103 composed of conductor wound by a lap-winding method through the slots.

The commutator assembly 101 comprises: a plurality of commutator segments 104 arranged circumferentially; risers 106 disposed on end portions of the commutator segments 104; brushes (not shown) contacting the commutator segments 104; and equalizers 107 electrically connecting commutator segments 104 which are to have the same electric potential by means of the risers 106.

In the above electric motor, by supplying electric current to the armature coil 103 from outside by means of the brushes contacting the commutator segments 104, the armature 100 and commutator assembly 101 which are secured to a rotor shaft (not shown) rotate together with the rotor shaft due to electromagnetic action.

The equalizers 107 are disposed with the objective of preventing unbalanced currents from flowing through the brushes, and since they are connected to commutator segments which are to have the same electric potential, current does not normally flow through them. However, unbalanced phenomena may occur for a variety of reasons such as machining errors, and as a result, brush commutation sparks, etc., may be generated, and then current flows through the equalizers 107 to suppress these imbalances.

End portions 108 of the equalizers 107 shown in FIG. 13 are secured to the risers 106 by brazing, etc. The equalizers 107 are secured and supported by securing members 109, as shown in FIG. 12, enabling the equalizers 107 to withstand centrifugal force. Furthermore, like the armature coil, the equalizers 107 are normally composed of copper wire or a conductor, and the cross-sectional area of the conductor portion of the equalizers 107 is known to be best made about one half to one third of the cross-sectional area of the conductor portion of the wire of the armature coil 103 (See "Electrical Machines Compendium, Direct-Current Machines, Chapter 10 Armature Windings, 10.3 Lap Windings and Wave Windings, Institute of Electrical Engineers", or "Equalizing Coils and Commutation, RM-98-11, Institute of Electrical Engineers, Dynamo Workshop Data", for example).

In order to minimize the amount of material in the equalizers 107 or to reduce the space they occupy as much as possible, it is usual to connect points to be connected over the shortest possible distance while ensuring enough separation so that the equalizers 107 do not interfere with each other. Here, "points to be connected" refers to points on an armature circuit (constituted by the armature coil, the risers, and the commutator segments) which are always equipotential independent of their position on the armature 100, such as equalizer segments 104 separated by the same pitch as the pole pairs, for example.

The resistance values of the equalizers 107 in such cases will be explained using FIG. 14.

FIG. 14 is a diagram showing the risers and one of the equalizers 107 in the vicinity of the commutator 105 from the armature 100 side. As shown in FIG. 14, the average value of the radius of rotation of the connecting portions between the equalizer 107 and the armature circuits (in this case, the risers 106) is defined as r1 (m), and the pitch of the pole pairs is defined as $\tau$ (rad). Furthermore, when the resistivity of the armature coil 103 is $\rho_0$ ($\Omega\cdot$m) and the cross-sectional area of the conductor portions of the armature coil 103 is S ($m^2$), if the value of the reference resistance $R_0$ ($\Omega$) is defined as $$R_0=(\rho_0\cdot(r1*\tau)/(S/3)),$$

the value of the resistance of the equalizers $R_{eq}$ ($\Omega$) which are composed of the same material as the armature coil is generally designed to be approximately twice that value at most. In other words, the value satisfies the expression $$R_{eq}\leqq R_0*2.$$

The electrical circuit in this case is shown in FIG. 15. FIG. 15 is an example in which equalizers 107 are disposed on all of the commutator segments 104 when there are four poles and twenty-two commutator segments. In a lap winding, it is usual to provide the same number of brushes as the number of poles, that is, four brushes 110 in the case of FIG. 15, two in each (positive and negative) polarity. In this case, if there are absolutely no causes for imbalance due to unbalanced machining, etc., the electric potential at both ends of all of the equalizers 107 is equal and no current flows through the equalizers 107. Furthermore, if the currents flowing through the four parallel circuits present under the main pole are given by i1, i2, i3, and i4, respectively, because the values of i1 and i2 are equal to those of i3 and i4, respectively, the values of the currents passing through each of the brushes 110 are all equal.

In a conventional direct-current electric motor such as that above, there may be differences between individual brushes 110 of the same polarity, and if an imbalance occurs between the voltage drops in the brushes 110 (voltage decreases resulting from resistance and contact resistance of the brushes 110), current flows through the equalizers 107, acting in a direction which makes the electric potential at both ends of the equalizers 107 equal.

FIG. 16 is a circuit diagram showing a case where there are differences between the contact resistances of individual brushes 110 and an imbalance has occurred between the parallel circuits. In the diagram, the contact resistances between the positive-side brushes 110 and the commutator segments are given as RB1, RB2, RB3, RB4, respectively, and the resistances of the equalizers are given as $R_{eq}1$ and $R_{eq}2$. Normally, RB1 and RB3, and RB2 and RB4, are constantly the same, and no currents flow though the equalizers $R_{eq}1$, $R_{eq}2$.

Now, let us suppose that there is an imbalance between RB1 and RB3, such that $$RB1<<RB3.$$

If $R_{eq}1$ is sufficiently small, instead of the current i3 being supplied via the contact portion RB3 of the lower brush, it will be supplied via the contact portion (resistance value RB3) of the upper brush 110. As a result, the current passing through the upper brush 110 will be approximately three times the current passing through the lower brush 110, and the tolerable current value of the upper brush will be exceeded, not only giving rise to fusion of members peripheral to the brushes 110 due to the generation of heat by the upper brush 110, but in the end leading to fusion of the upper brush 110 itself. In order to prevent this, it has been necessary to take measures such as averaging out the differences between voltage drops in individual brushes 110 and reducing imbalances in the circuits by designing the brushes 110 with a greater current tolerance than necessary in order to be prepared for current imbalances resulting from differences between the contact resistances of individual brushes 110, or by disposing a plurality of brush segments 110*a* to a 110*d* in contact with the same commutator segment 104, as shown in FIG. 17.

Thus, in a conventional direct-current electric motor, one problem has been the necessity to ensure sufficient current tolerance in the brushes 110, or to increase machining precision in order to reduce individual differences, consequently leading to cost increases, size increases, and poor productivity.

SUMMARY OF THE INVENTION

The present invention aims to solve the above problems and an object of the present invention is to provide a dynamo-electric machine having superior properties while preventing the brush currents from exceeding tolerable values.

To this end, according to the present invention, there is provided a dynamo-electric machine comprising: an armature having a core provided with a plurality of slots extending longitudinally and an armature coil formed by winding a wire into the slots; a commutator assembly having a plurality of commutator segments arranged thereon, risers disposed on end portions of the commutator segments, and brushes in contact with the commutator segments; a equalizer electrically connecting portions of armature circuits comprising the armature coil, the risers, and the commutator segments which are to have the same electric potential, the dynamo-electric machine satisfying an expression $R_{eq} \geqq (\rho_0 \cdot (r1 * \tau)/(S/3)) * (2.5)$ where $\rho_0$ ($\Omega \cdot$m) is the resistivity of the wire of the armature Coil, S ($m^2$) is the cross-sectional area of the conductor portions of the wire, r1 (m) is radius of rotation of the connecting portions between the armature circuits and the equalizer, $\tau$ (rad) is the pitch of pole pairs, and $R_{eq}$ ($\Omega$) is the resistance value of the equalizer.

DETAILED DESCRIPTION OF THE PREFERRED EMBODIMENTS

Embodiment 1

Embodiment 1 will be explained using FIGS. 1 to 5.

Figure 1:
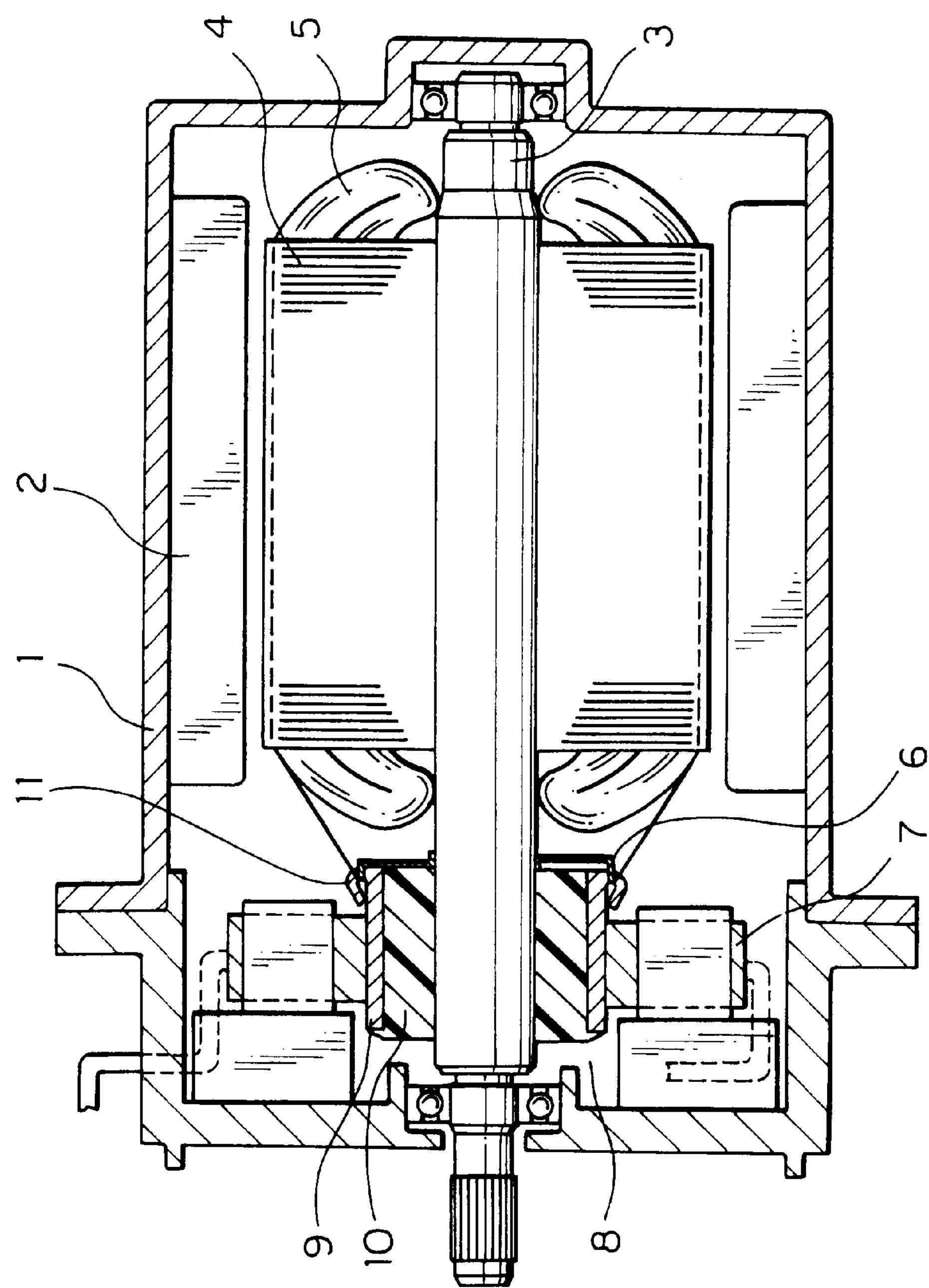
FIG. 1 is a diagram of the complete construction of an electric motor according to Embodiment 1 of the present invention.

FIG. 1 is a diagram of the complete construction of a direct-current electric motor which is a dynamo-electric machine according to Embodiment 1 of the present invention, where: reference numeral 1 denotes a stator yoke; 2 denotes permanent magnets secured around the inner circumferential surface of the stator yoke 1; 3 denotes a rotor shaft disposed so as to rotate freely within the stator yoke 1; 4 denotes a core secured to the rotor shaft 3; 5 denotes an armature coil composed of wire wound into slots in the core 4; 7 denotes brushes pressed against the surface of a commutator 8; and 6 denotes equalizers disposed at one end of the commutator 8.

The commutator 8 comprises a plurality of commutator segments 9 disposed with even pitch around the circumference thereof, risers 11 disposed on end portions of the commutator segments 9, and a commutator molded portion 10 disposed inside the commutator segments 9 for securing the commutator segments 9 and insulating between the commutator segments 9.

Moreover, the core 4 and the armature coil 5 constitute an armature, and the commutator 8 and the brushes 7 constitute a commutator assembly.

The armature coil 5 is composed of an enamel-coated copper wire capable of being machine wound, and is electrically connected to the commutator segments 9 by means of the hook-shaped risers 11 disposed on end portions of the commutator segments 9. With the aim of improving the windability of the armature coil 5 during the automatic winding process, of preventing excessive stress bearing on the risers 11, and of shortening the axial length of end portions of the armature coil, the windings of the armature coil 5 is “double windings”, in which fine wire having a diameter providing approximately half of the cross-sectional area required in the conductor portion is doubly wound.

Figure 2:
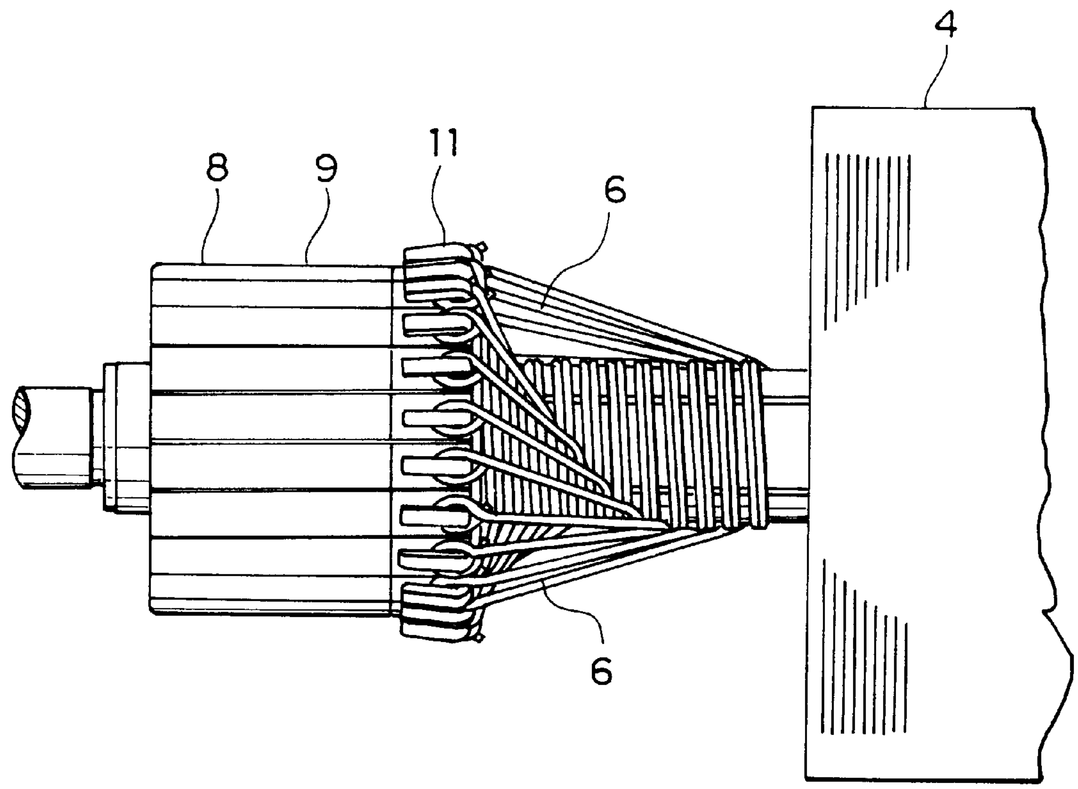
FIG. 2 is a front elevation of the commutator assembly in FIG. 1 and the vicinity thereof.
Figure 3:
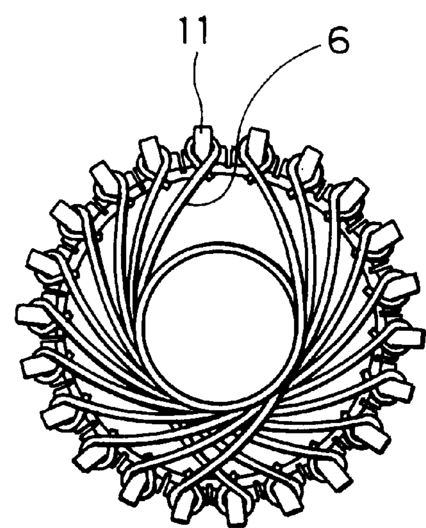
FIG. 3 is a side elevation of the commutator assembly in FIG. 1 viewed from the armature side.
Figure 4:
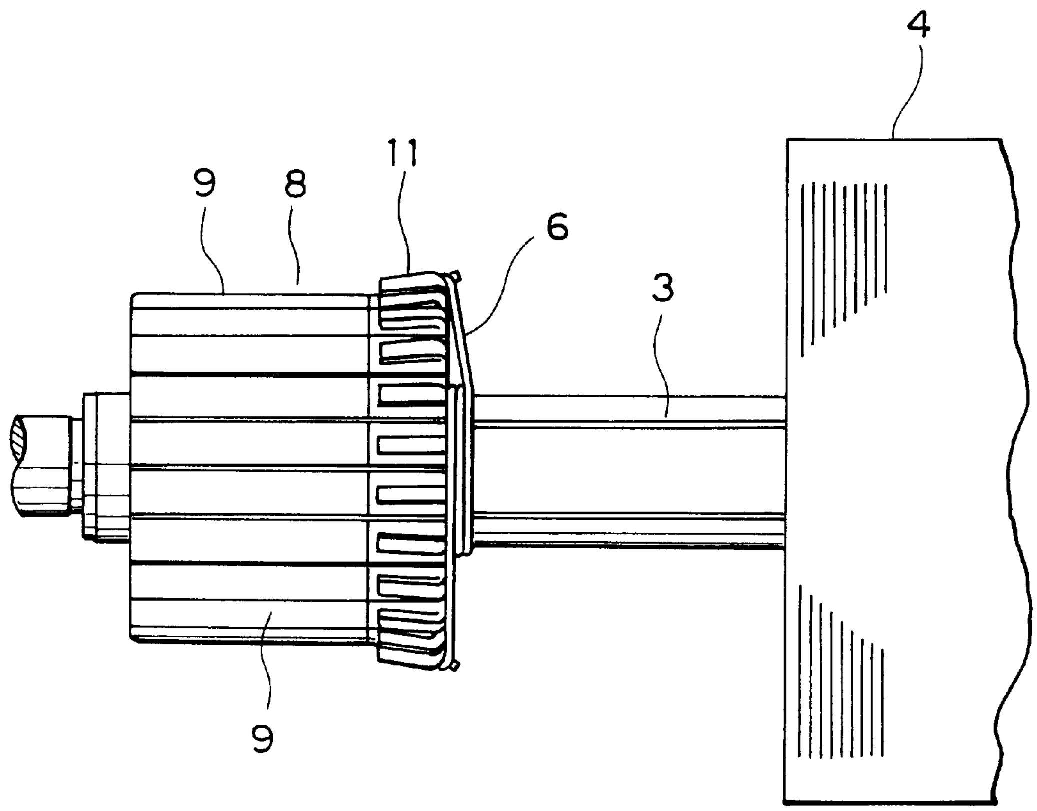
FIG. 4 is a front elevation of the commutator assembly in FIG. 1 and the vicinity thereof.
Figure 5:
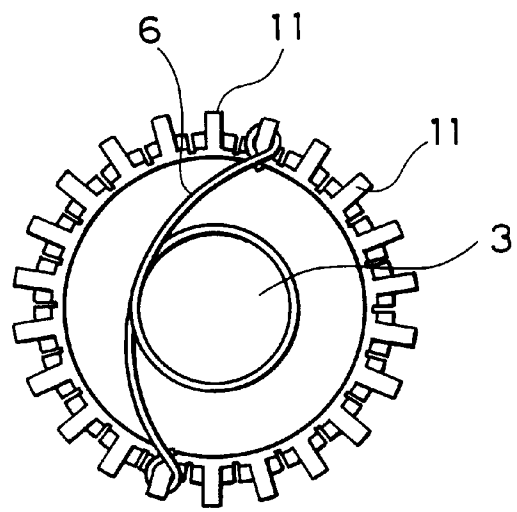
FIG. 5 is a side elevation of the commutator assembly in FIG. 1 viewed from the armature side.

FIGS. 2 and 4 are front elevations of the commutator 8 in FIG. 1 and the vicinity thereof, and FIGS. 3 and 5 are side elevations of the commutator 8 viewed from the armature side. Moreover, only one of the equalizers 6 is shown in FIGS. 4 and 5. Furthermore, the armature coil 5, etc., have been omitted and only relevant parts are shown.

The equalizers 6 constitute separate members from the risers 11 and are composed of the same wire material as the armature coil 5, namely, enamel-coated copper wire. Since the armature coil 5 is double windings and the equalizers 6 are single, the cross-sectional area of the conductor portions of the equalizers 6 is half the cross-sectional area of the conductor portions of the armature coil 5. Since the equalizers 6 are separate members from the risers in this way, they can be designed to have a smaller current capacity than the armature coil 5.

The ends of the equalizers are each attached to the hook-shaped risers 11 disposed on the commutator segments. After attaching the equalizers 6, the wire of the armature coil 5 is similarly attached to the risers 11, then all are electrically connected by fusion or the like. That is to say, fusion or the like is performed with the wire of the armature coil 5 and the equalizers 6 connected to the same risers 11.

The equalizers 6 constantly connect between commutator segments 9 which are to have the same electric potential independent of the position of the armature. This embodiment is an example in a 4-pole 22-slot machine and connects commutator segments 9 positioned at a mechanical angle of $\pi$ (rad) from each other.

Here, the equalizers 6 are wound several times around the rotor shaft 3. Using this construction, the resistance values can be increased while using the same wire materials as the wire in the armature coil 5. For example, if the radius of rotation of the risers 11 disposed on the commutator segments 9 is 12 mm, and the diameter of the rotor shaft 3 is 12 mm, the length of the each of the equalizers 6 when the equalizers 6 are disposed in semicircles around the commutator 8 is 40 mm, but by winding them three times around the rotor shaft 3 the length of the equalizers 6 can be increased to approximately 150 mm, or approximately 3.75 times as long. Assuming that the same material is being used, because the resistivity is the same, even taking into consideration the ratio of the cross-sectional areas of the conductor portions, resistance values more than 2.5 times the value of the reference resistance can be obtained. In this case, it was possible to suppress current imbalances between two sets of brushes 7 having the same positive or negative polarity, respectively, to within a tolerable range.

By appropriately selecting the resistance values of the equalizers in this manner, it is possible to absorb differences between the voltage drops in individual brushes 7, enabling the average current passing through each of the brushes to be equalized. As a result, there is no longer any need to design the brushes 7 with a greater current tolerance than necessary, enabling the brushes to be reduced in size.

Figure 17:
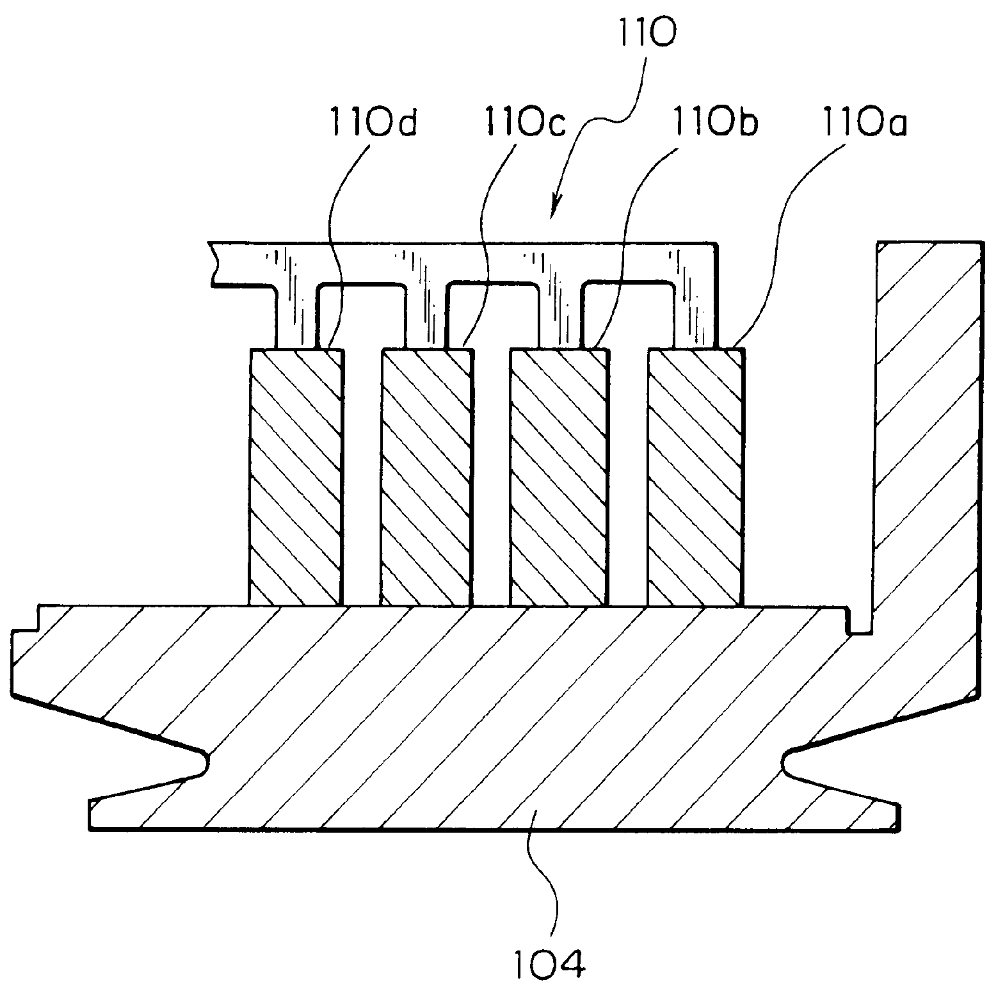
FIG. 17 is a structural diagram showing an example of a plurality of brush segments disposed in simultaneous contact with a commutator segment in the electrical circuits of a conventional direct-current electric motor.

Furthermore, since differences between individual brushes 7 can be absorbed by this embodiment, it is no longer necessary to dispose a plurality of brush segments 110*a* to 110*d* in contact with the same commutator segment 104 as shown in FIG. 17, enabling the number of brush segments in contact with the same commutator segment to be reduced to one. As a result, the number of parts and the number of steps in assembly can be reduced, enabling size reductions and cost reductions to be implemented in the motor.

Embodiment 2

Figure 6:
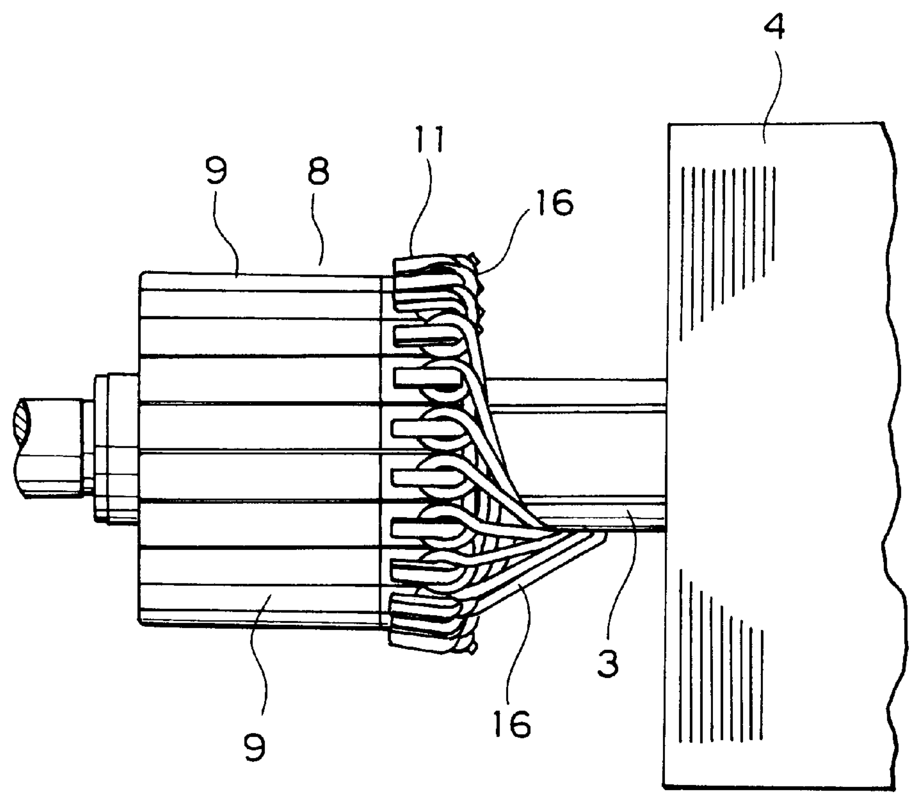
FIG. 6 is a front elevation of a commutator assembly of an electric motor according to Embodiment 2 and the vicinity thereof.
Figure 7:
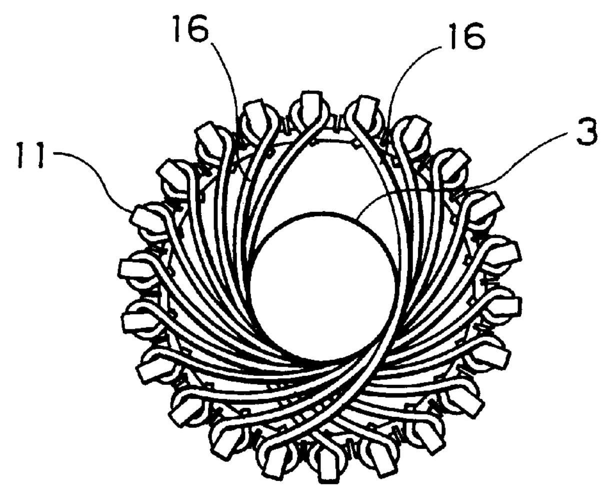
FIG. 7 is a side elevation of the commutator assembly in FIG. 6 viewed from the armature side.

FIG. 6 is a partial front elevation of a direct-current electric motor according to Embodiment 2, and FIG. 7 is a side elevation of FIG. 6 viewed from the armature side. Portions the same as or corresponding to those in FIGS. 1 to 5 will be explained using the same numbering.

The wire of the equalizers 16 in this embodiment differs from the wire of the armature coil 5 in that it is composed of enamel-coated brass wire. Connection to the commutator segments 9 and other parts of the construction are the same as for Embodiment 1.

In this embodiment, because the resistivity of brass is approximately four times that of copper, the resistance of the equalizers 6 can be increased, and furthermore the construction disposes the equalizers 16 in semicircles around the commutator 8 to minimize their length. By using brass wire in this manner, it was possible to make the resistance values of the equalizers 16 more than 2.5 times the value of the reference resistance while minimizing the space occupied by the equalizers 16. In this case, it was possible to suppress current imbalances between brushes 7 having the same polarity to within a tolerable range.

Moreover, brass equalizers 16 were used in this embodiment, but the material of the equalizers is not limited thereto and may be red brass, cupronickel, or iron, for example. By using material with resistivity 2.5 times that of the armature coil, it is possible to suppress current imbalances between brushes 7 having the same polarity to within a tolerable range while ensuring adequate cross-sectional area of the conductor portions of the equalizers and improving productivity.

Embodiment 3

Figure 8:
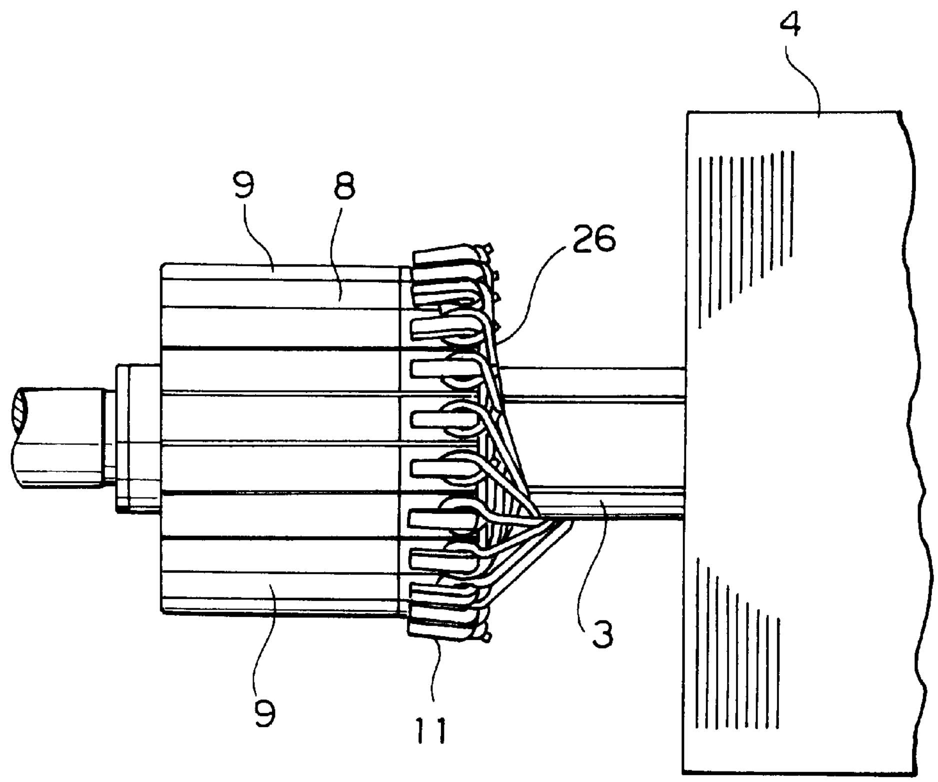
FIG. 8 is a front elevation of a commutator assembly of an electric motor according to Embodiment 3 and the vicinity thereof.
Figure 9:
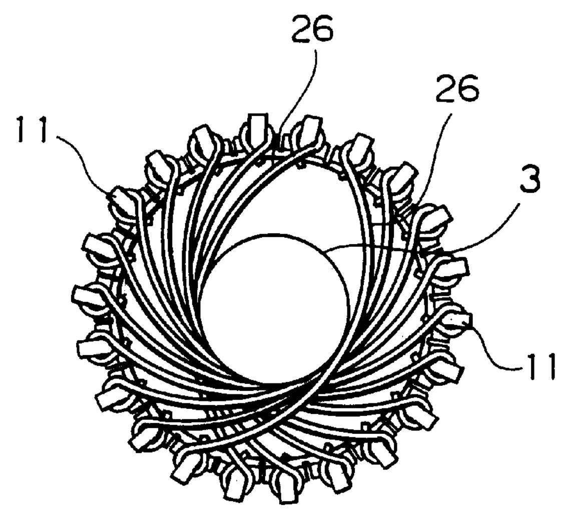
FIG. 9 is a side elevation of the commutator assembly in FIG. 8 viewed from the armature side.
Figure 10:
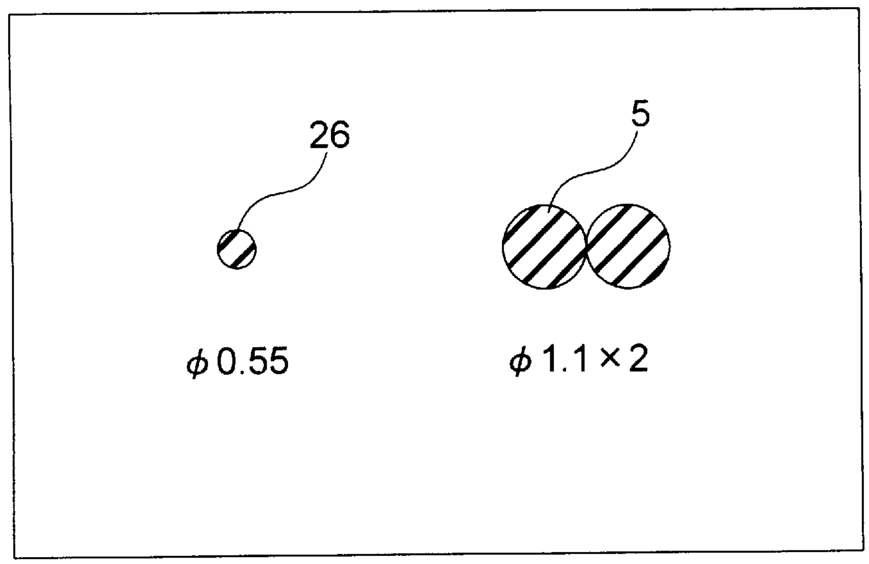
FIG. 10 is diagram comparing the diameter of the wire in the armature coil with that of the equalizers in the electric motor according to Embodiment 3.

FIG. 8 is a partial front elevation of a direct-current electric motor according to Embodiment 3, FIG. 9 is a side elevation of FIG. 8 viewed from the armature side, and FIG. 10 is diagram comparing the diameter of the wire in the armature coil with the diameter of the wire in the equalizers from FIG. 8. Portions the same as or corresponding to those of Embodiment 1 will be explained using the same numbering.

The equalizers 26 in this embodiment have a wire diameter in which the ratio of the cross-sectional area of the conductor portions thereof to those of the armature coil 5 is 0.13 (2/15) or less. For example, assuming that the armature coil 5 is double windings of diameter 1.1 mm, the cross-sectional area of the conductor portions of the armature coil 5 is 1.9 $mm^2$, and if copper wire with a diameter of 0.55 mm is used to construct the equalizers 26, the cross-sectional area of the conductor portions thereof is 0.238 $mm^2$, making the ratio of the cross-sectional area of the conductor portions 0.125 (1/8). In this case, the resistance values of the equalizers 16 were more than 2.5 times the value of the reference resistance while minimizing the space occupied by the equalizers 16 and it was possible to suppress current imbalances between brushes 7 having the same polarity to within a tolerable range.

According to this embodiment, it is possible to increase the resistance of the equalizers 26 while connecting commutator segments which are to have the same electric potential by the shortest possible distance using wire of the same material as the armature coil 5. For that reason, it is possible to improve the performance of the equalizers while reducing the costs required. Furthermore, because the armature coil 5, the equalizers 26, and the commutator segments 9 are all made of the same copper material, the fused portions have good affinity, enabling productivity to be improved in the fusion process.

The present invention is not limited to the direct-current electric motors of Embodiments 1 to 3, and can also be applied to generators. Furthermore, within the range in which the resistance values of the equalizers satisfy the prescribed conditions, the factors of length, resistivity, and cross-sectional area of the conductor portions may also be combined. Furthermore, in the above embodiments, the equalizers and the armature circuits are connected by means of the risers, but they are not limited thereto, and the equalizers may also be connected to the commutator segments or to the armature coil.

Figure 11:
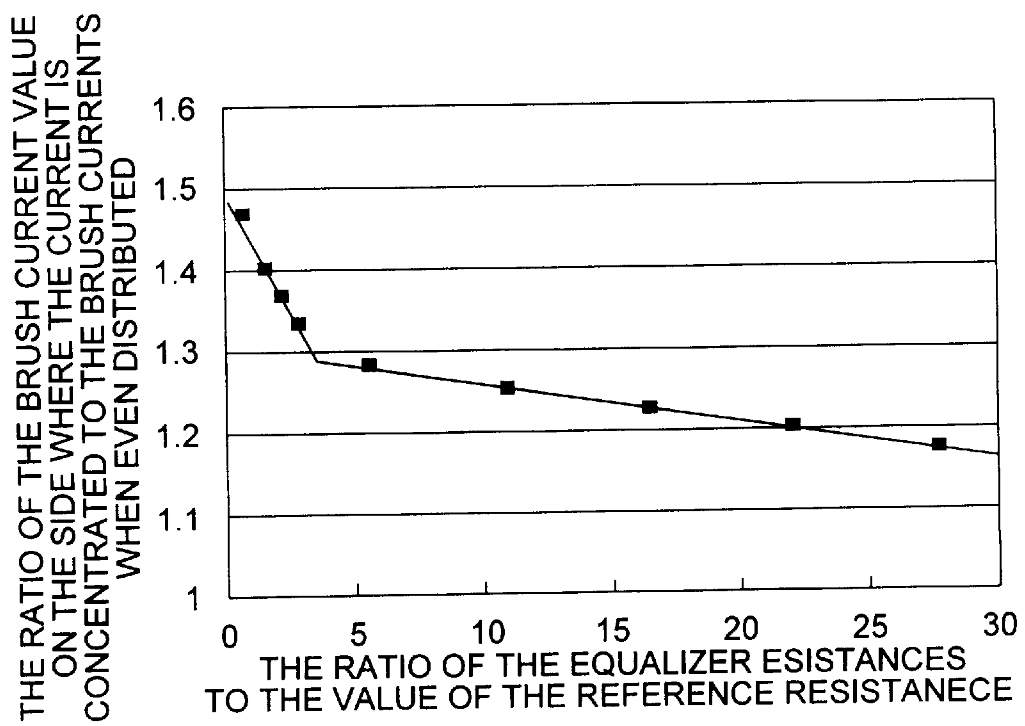
FIG. 11 is a graph showing the relationship between brush current imbalances and resistance values of the equalizers according to the present invention.
Figure 12:
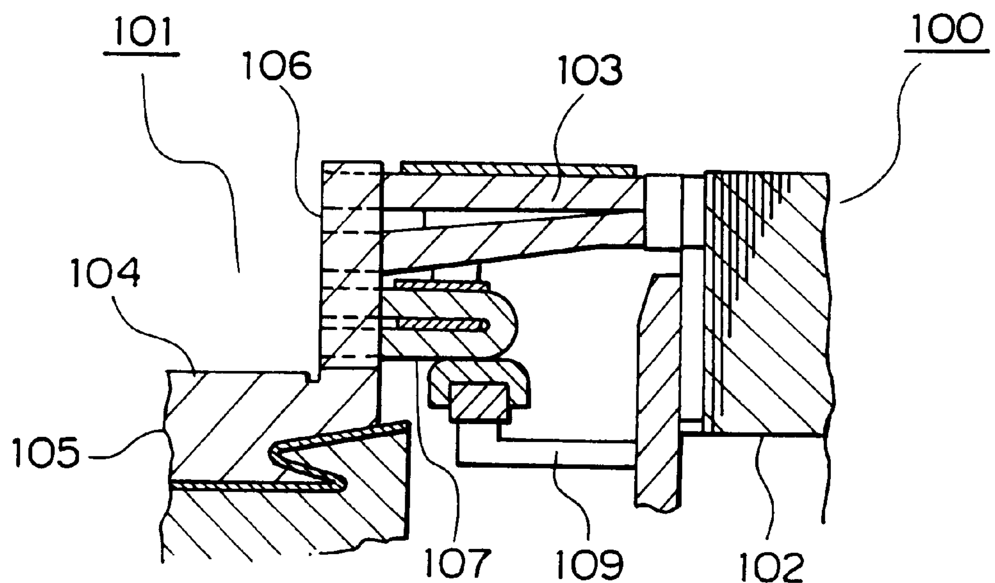
FIG. 12 is a partial cross-section of a conventional direct-current electric motor.
Figure 13:
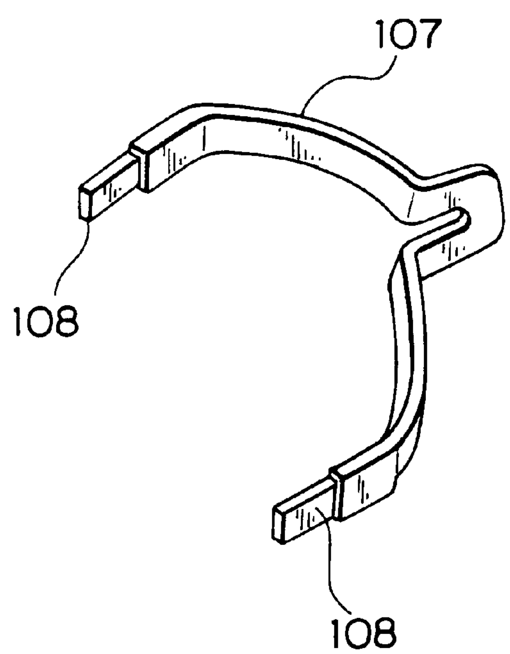
FIG. 13 is a perspective of an equalizer from FIG. 12.
Figure 14:
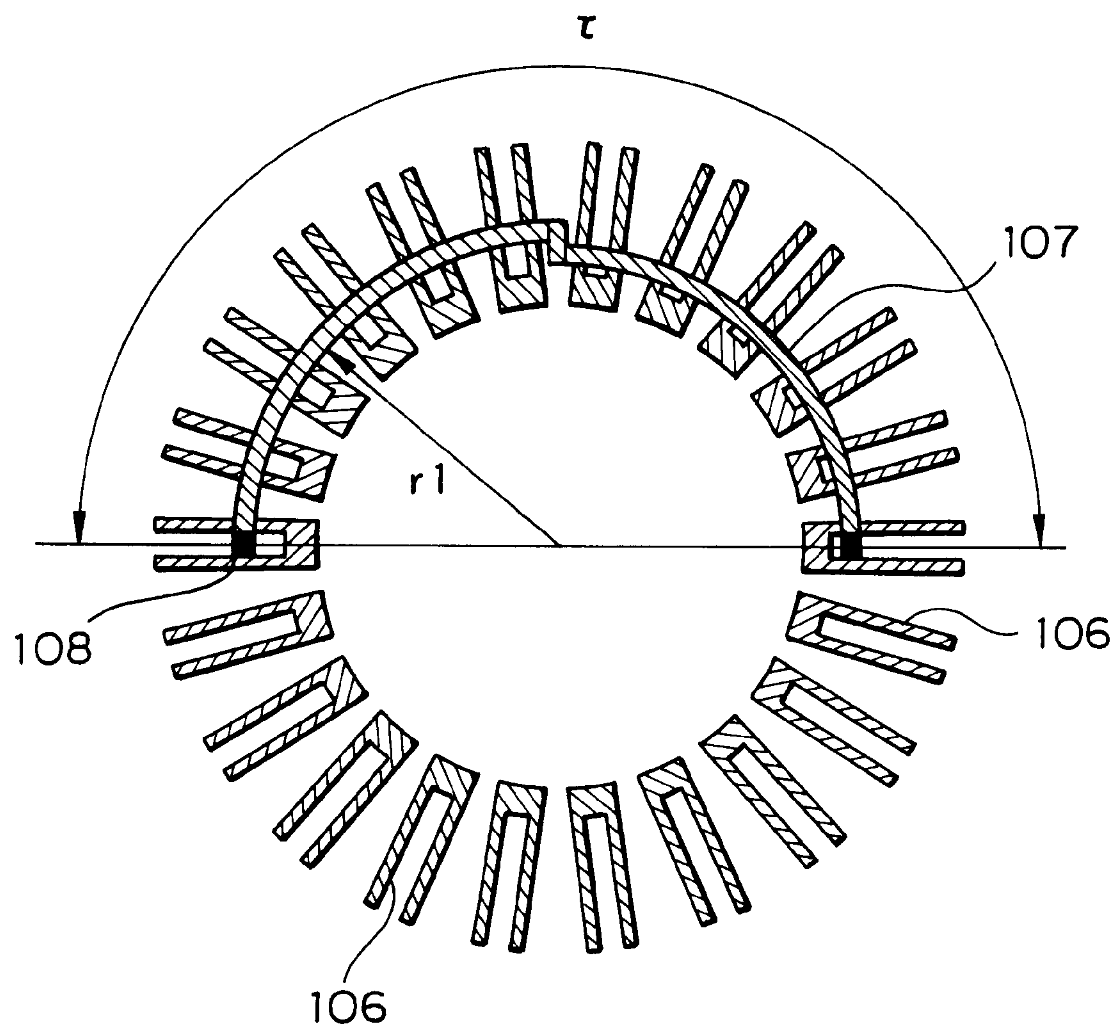
FIG. 14 is a diagram showing the arrangement of the risers and an equalizer from FIG. 12.
Figure 15:
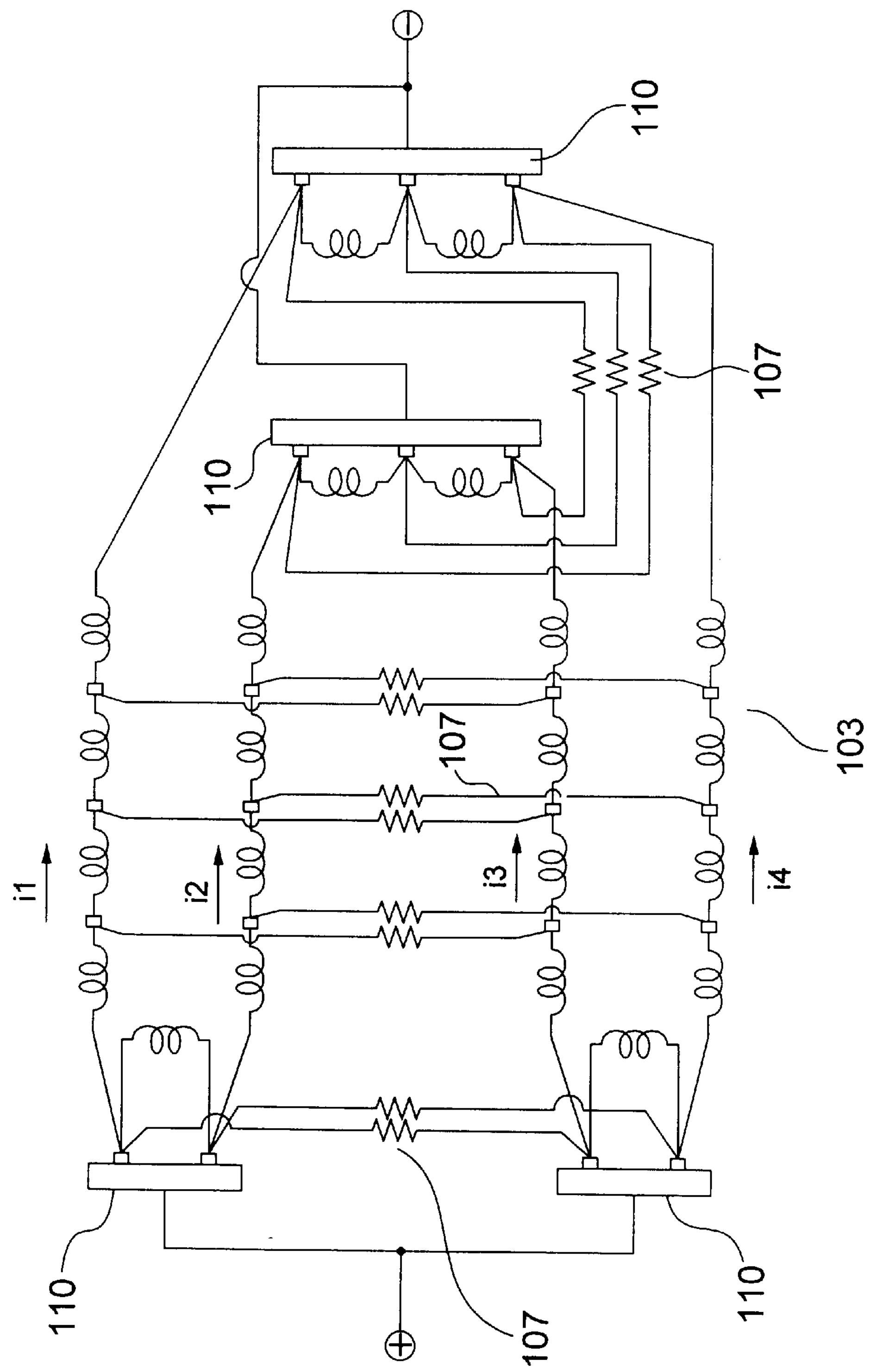
FIG. 15 is an electrical circuit diagram of a conventional direct-current electric motor.
Figure 16:
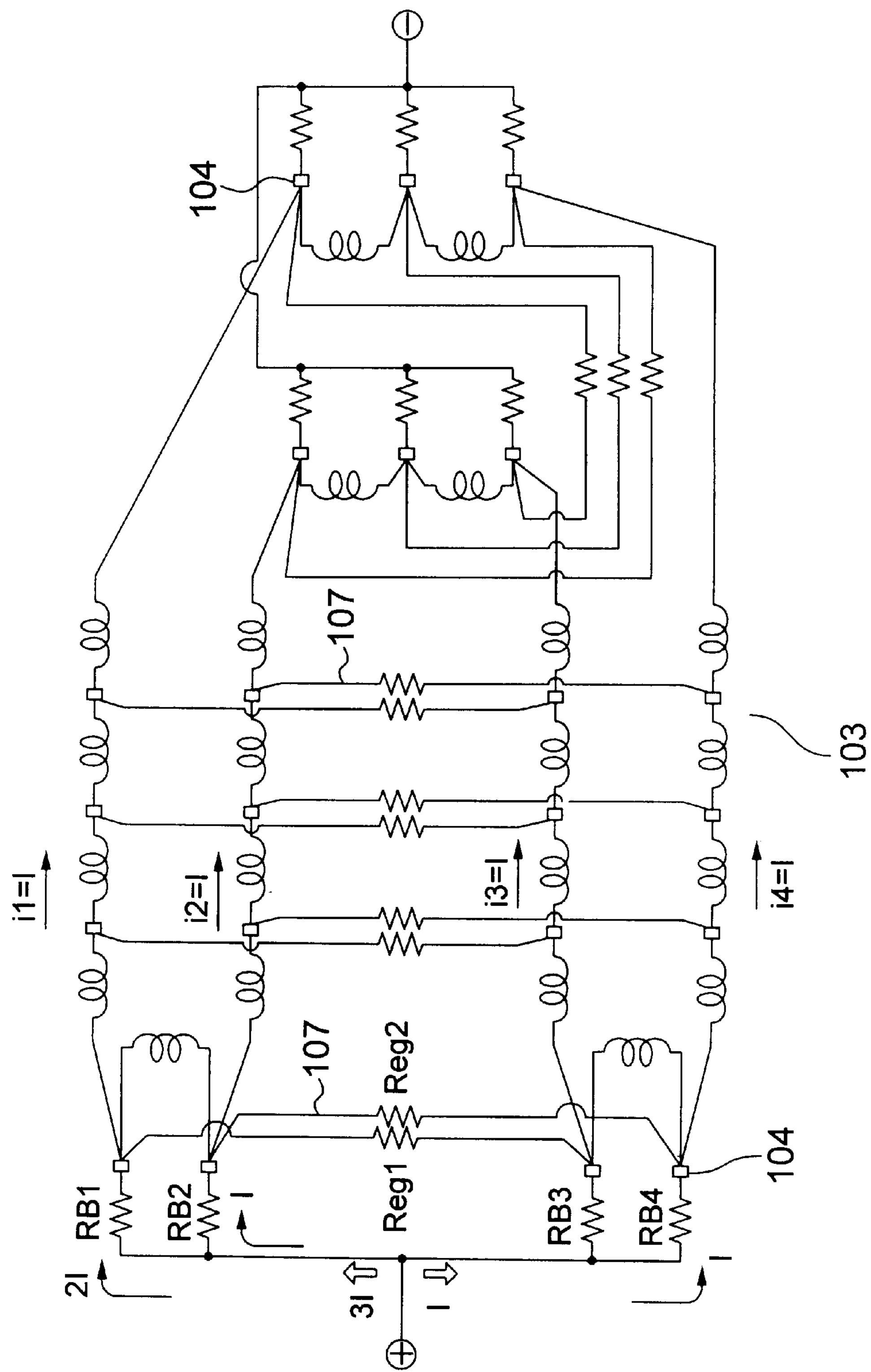
FIG. 16 is an electrical circuit diagram explaining brush current imbalances in the electrical circuits of a conventional direct-current electric motor.

The results obtained from investigating the relationship between current imbalances in a plurality of brushes having the same polarity relative to the resistance values of the equalizers are shown in FIG. 11.

In FIG. 11, the horizontal axis is the ratio of the equalizer resistances to the value of the reference resistance, and the vertical axis represents the ratio of the brush current value on the side where the current is concentrated to the brush currents when evenly distributed. As is clear from FIG. 11, when the resistance values of the equalizers were less than 2.5 times the value of the reference resistance, imbalances in the brush currents increased. The armature coil were composed of copper wire of 0.7 mm diameter wound ten turns for two laps, and the brushes used were metallic graphite brushes composed of approximately 60 percent carbon and 40 percent copper.

This relationship was practically the same in the case of all of Embodiments 1 to 3 and was defined by the resistance values of the equalizers.

In the above manner, a dynamo-electric machine according to one aspect of the present invent comprises: an armature having a core provided with a plurality of slots extending longitudinally and an armature coil formed by winding a wire into the slots; a commutator assembly having a plurality of commutator segments arranged thereon, risers disposed on end portions of the commutator segments, and brushes in contact with said commutator segments; a equalizer electrically connecting portions of armature circuits comprising the armature coil, the risers, and the commutator segments which are to have the same electric potential, the dynamo-electric machine satisfying an expression $R_{eq} \geqq (\rho_0 \cdot (r1*\tau)/(S/3)*(2.5)$ where $\rho_0$ ($\Omega \cdot$m) is the resistivity of the wire of the armature coil, S ($m^2$) is the cross-sectional area of the conductor portions of the wire, r1 (m) is radius of rotation of the connecting portions between the armature circuits and the equalizer, $\tau$ (rad) is the pitch of pole pairs, and $R_{eq}$ ($\Omega$) is the resistance value of the equalizer. Therefore, the resistance of the equalizers is increased, enabling imbalances in brush currents between a plurality of brushes having the same polarity to be cancelled, thereby preventing fusion, etc., of members peripheral to the brushes and of the brushes themselves due to generation of heat by the brushes.

According to one form of the dynamo-electric machine, the dynamo-electric may satisfy an expression $L \geqq (r1*\tau*2.5)$ where L (m) is the length of the equalizer, r1 (m) is the average value of the, radius of rotation of the connecting portions between the armature circuits and the equalizer, and $\tau$ (rad) is the pitch of the pole pairs. Therefore, the resistance of the equalizers is increased while using the same wire material as the wire of the armature coil, thereby improving productivity.

According to another form of the dynamo-electric machine, the resistivity of the equalizer may be greater than the resistivity of the wire of the armature coil. Therefore, the compact equalizer with large resistance value can be obtained.

According to still another form of the dynamo-electric machine, the equalizer may be an enamel-coated brass wire, and the wire of the armature coil may be an enamel-coated copper wire. Therefore, the compact equalizer with large resistance value can be obtained.

According to another form of the dynamo-electric machine, the equalizer may be an enamel-coated red brass wire, and the wire of said armature coil may be an enamel-coated copper wire. Therefore, the compact equalizer with large resistance value can be obtained.

According to still another form of the dynamo-electric machine, the cross-sectional area of the conductor portions of the equalizer may be less than 0.13 (2/15) of the cross-sectional area of the conductor portion of the wire of the armature coil. Therefore, the compact equalizer with large resistance value and good fusion affinity can be obtained.

According to another form of the dynamo-electric machine, the equalizer and the risers may be composed of independent members. Therefore, the equalizer can be designed so that their current capacity is less than that of the risers and the armature coil, enabling equalizer with large resistance value to be obtained easily.

According to another form of the dynamo-electric machine, only a single brush may be in contact with any one of the commutator segments. Therefore, the number of parts is reduced, enabling a small, inexpensive, highly productive dynamo-electric machine to be obtained.

What is claimed is:

1. A dynamo-electric machine comprising:

an armature having a core provided with a plurality of slots extending longitudinally and an armature coil formed by winding a wire into said slots;

a commutator assembly having a plurality of commutator segments arranged thereon, risers disposed on end portions of said commutator segments, and brushes in contact with said commutator segments;

a equalizer electrically connecting portions of armature circuits comprising said armature coil, said risers, and said commutator segments which are to have the same electric potential, said dynamo-electric machine satisfying an expression $$R_{eq} \geqq (\rho_0 \cdot (r1*\tau)/(S/3))*(2.5)$$

where $\rho_0$($\Omega \cdot$m) is the resistivity of said wire of said armature coil, S ($m^2$) is the cross-sectional area of the conductor portions of said wire, r1 (m) is radius of rotation of the connecting portions between said armature circuits and said equalizer, $\tau$ (rad) is the pitch of pole pairs, and $R_{eq}$ ($\Omega$) is the resistance value of said equalizer.

2. The dynamo-electric machine according to claim 1 satisfying an expression $$L \geqq (r1*\tau*2.5)$$

where

L (m) is the length of said equalizer, r1 (m) is the average value of the radius of rotation of said connecting portions between said armature circuits and said equalizer, and $\rho$ (rad) is the pitch of said pole pairs.

3. The dynamo-electric machine according to claim 1 wherein the resistivity of said equalizer is greater than the resistivity of said wire of said armature coil.

4. The dynamo-electric machine according to claim 3 wherein said equalizer is an enamel-coated brass wire, and said wire of said armature coil is an enamel-coated copper wire.

5. The dynamo-electric machine according to claim 3 wherein said equalizer is an enamel-coated red brass wire, and said wire of said armature coil is an enamel-coated copper wire.

6. The dynamo-electric machine according to claim 1 wherein the cross-sectional area of said conductor portions of said equalizer is less than 0.13 (2/15) of the cross-sectional area of said conductor portions of said wire of said armature coil.

7. The dynamo-electric machine according to claim 1 wherein said equalizer and said risers are composed of independent members.

8. The dynamo-electric machine according to claim 1 wherein only a single brush is in contact with any one of said commutator segments.

* * * * *